(12) United States Patent
Olkkonen et al.

(10) Patent No.: US 11,846,777 B2
(45) Date of Patent: Dec. 19, 2023

(54) INTERFERENCE-FREE WAVEGUIDE DISPLAY

(71) Applicant: DISPELIX OY, Espoo (FI)

(72) Inventors: Juuso Olkkonen, Espoo (FI); Kasimir Blomstedt, Espoo (FI)

(73) Assignee: DISPELIX OY, Espoo (FI)

( * ) Notice: Subject to any disclaimer, the term of this patent is extended or adjusted under 35 U.S.C. 154(b) by 171 days.

(21) Appl. No.: 16/954,939

(22) PCT Filed: Dec. 4, 2018

(86) PCT No.: PCT/FI2018/050878
§ 371 (c)(1),
(2) Date: Jun. 17, 2020

(87) PCT Pub. No.: WO2019/122502
PCT Pub. Date: Jun. 27, 2019

(65) Prior Publication Data
US 2020/0379259 A1 Dec. 3, 2020

(30) Foreign Application Priority Data

Dec. 22, 2017 (FI) .................................. 20176158

(51) Int. Cl.
*G02B 27/01* (2006.01)
*G02B 1/11* (2015.01)
(Continued)

(52) U.S. Cl.
CPC ............ *G02B 27/0172* (2013.01); *G02B 1/11* (2013.01); *G02B 1/115* (2013.01); *G02B 5/1814* (2013.01);
(Continued)

(58) Field of Classification Search
CPC .............. G02B 27/0081; G02B 27/017; G02B 27/0172; G02B 27/4205; G02B 1/11;
(Continued)

(56) References Cited

U.S. PATENT DOCUMENTS

| | | | |
|---|---|---|---|
| 8,189,263 B1 * | 5/2012 | Wang | G02B 27/0172 |
| | | | 359/633 |
| 2003/0123244 A1 | 7/2003 | Ishitaka | |

(Continued)

FOREIGN PATENT DOCUMENTS

| | | |
|---|---|---|
| CN | 102213858 A | 10/2011 |
| JP | 2016126134 A | 7/2016 |
| WO | 2019/122521 A1 | 6/2019 |

OTHER PUBLICATIONS

Glybovski, S. et al. "Metasurfaces: From microwave to visible. In: Physics Reports." Elsevier [online], May 4, 2016, vol. 634, pp. 1-72, Retrieved from: https://www.sciencedirect.com/science/article/pii/S0370157316300618, http://dx.doi.org/10.1016/j.physrep.2016.04.004.

(Continued)

*Primary Examiner* — Nitin Patel
*Assistant Examiner* — Cory A Almeida
(74) *Attorney, Agent, or Firm* — Maschoff Brennan

(57) ABSTRACT

The invention relates to a diffractive waveguide display device comprising an image projector capable of emitting laser rays at one or more wavelengths, a waveguide body having a first surface and an opposite second surface and adapted to guide said laser rays from the image projector between the first surface and the second surface, an out-coupling diffractive optical element on said first surface for coupling said laser rays out of the waveguide body, and an (Continued)

anti-interference coating (35) arranged on the second surface of the waveguide body aligned with the out-coupling diffractive optical element.

19 Claims, 3 Drawing Sheets

(51) Int. Cl.
    *G02B 27/00*     (2006.01)
    *G02B 27/42*     (2006.01)
    *G02B 1/115*     (2015.01)
    *G02B 5/18*     (2006.01)
    *F21V 8/00*     (2006.01)
    *G02B 6/00*     (2006.01)

(52) U.S. Cl.
    CPC ............ *G02B 6/00* (2013.01); *G02B 6/0038* (2013.01); *G02B 27/0018* (2013.01); *G02B 27/0081* (2013.01); *G02B 27/0101* (2013.01); *G02B 27/42* (2013.01); *G02B 27/4205* (2013.01); *G02B 2027/012* (2013.01)

(58) Field of Classification Search
    CPC .......... G02B 2027/012; G02B 27/0018; G02B 27/0101; G02B 27/0103; G02B 27/42; G02B 1/115; G02B 5/1814; G02B 5/201; G02B 6/00; G02B 6/0038

See application file for complete search history.

(56) References Cited

U.S. PATENT DOCUMENTS

| | | | |
|---|---|---|---|
| 2008/0049431 A1* | 2/2008 | Boek | H01L 51/5281 362/311.06 |
| 2009/0220774 A1 | 9/2009 | Imai et al. | |
| 2011/0242742 A1 | 10/2011 | Kim et al. | |
| 2016/0370582 A1 | 12/2016 | Watanabe | |
| 2017/0131545 A1* | 5/2017 | Wall | G02B 6/001 |
| 2017/0235142 A1* | 8/2017 | Wall | G02B 5/26 359/633 |
| 2017/0293141 A1* | 10/2017 | Schowengerdt | G02B 27/0101 |
| 2017/0299865 A1* | 10/2017 | Vallius | G02B 27/0081 |
| 2017/0357101 A1 | 12/2017 | Tervo et al. | |

OTHER PUBLICATIONS

FI Search Report in Application No. 20176158 dated May 25, 2018.
CN Office Action in Application No. 201880081638.9 dated Jul. 23, 2021.
EP Search Report in Application No. 18891001.2 dated Jul. 22, 2021.

* cited by examiner

INTERFERENCE-FREE WAVEGUIDE DISPLAY

FIELD OF THE INVENTION

The invention relates to diffractive waveguide displays. In particular, the invention relates to an improved out-coupling arrangement in such displays.

BACKGROUND OF THE INVENTION

Head-mounted displays (HMDs) and head-up displays (HUDs) can be implemented using waveguide technology. Light can be coupled to a waveguide, redirected therein or coupled out of the waveguide using diffraction gratings. In one conventional display design, light is directed from a projector to an in-coupling grating, which diffracts the wavelengths of the incoming light into the waveguide, where they propagate via total internal reflections towards an out-coupling grating. The out-coupling grating diffracts light out of the waveguide, reproducing the image originally displayed to the in-coupling grating.

Diffractive waveguides when used with light sources having narrow spectral bandwidth (such as lasers and optically filtered LEDs) suffer typically from interference patterns visible in the virtual image. These interference patterns are often cylindrically symmetric and referred to as Newton rings. This is an undesired effect since it weakens the quality of the image produced by the display.

SUMMARY OF THE INVENTION

It is an aim of the invention to overcome the interference problem and to provide an interference-free out-coupling arrangement for diffractive displays and a diffractive display utilizing such arrangement.

The invention is based on preventing the formation of interference patterns using an anti-interference coating on a surface of the waveguide body opposite to the surface where the out-coupling grating is located. The anti-interference coating reduces the intensity of stray rays that interfere with the out-coupled rays.

In particular, the invention is characterized by what is stated in the independent claims.

Thus, according to one aspect, the invention provides a diffractive waveguide display device comprising
- an image projector capable of emitting laser rays at one or more wavelengths,
- a waveguide body having a first surface and an opposite second surface and adapted to guide said laser rays from the image projector between the first surface and the second surface,
- an out-coupling diffractive optical element on said first surface for coupling said laser rays out of the waveguide body,
- an anti-interference coating arranged on the second surface of the waveguide body aligned with the out-coupling diffractive optical element.

The invention offers significant benefits. The invention prevents or at least decreases the generation of visually observable Newton rings due to internal stray reflections and interference of reflected light with the out-coupled light. This is of particular relevance if the coherence length of the laser rays of the image projector is at the same order or higher than the optical path difference of the interfering rays.

The invention also suits for see-through displays, in which passing of ambient light to the user's eye is desired.

The dependent claims are directed to selected embodiments of the invention.

In some embodiments, the anti-interference coating is laterally uniform. Thus, it may have spatially constant optical properties.

In some embodiments, the anti-interference coating is laterally non-uniform. It may have a plurality of regions, either distinct or continuous, of different optical properties, such as angular reflectivity characteristics. In more detail, the coating may have a first zone corresponding to a first field-of-view angle and having first optical properties, and a second zone corresponding to a second field-of-view angle and having second optical properties different from the first optical properties.

Spatially varying optical properties may be achieved using a coating having laterally non-uniform thickness and/or laterally non-uniform multilayer structure and/or providing a plurality of distinct coating regions adjacent to each other, the regions having different optical properties.

The properties of the coating may be made to vary over the region of the out-coupling grating so that the thickness in each location thereof is optimized for angles emanating from that area to the location of the eye of the user of the device.

In some embodiments, the the anti-interference coating comprises a multilayer coating with alternating layers of different materials having different refractive indices, for example a stack of alternating layers of $Al_2O_3$ or $TiO_2$ and $MgF_2$ or $SiO_2$.

In some embodiments, the coating comprises a single layer structure, such as a single layer of $MgF_2$.

In some embodiments, the display comprises a plurality of waveguide bodies stacked on top of each other. In particular, each body may comprise an anti-interference coating with different optical properties, such as wavelength or angle specificity.

In some embodiments, the anti-interference coating has an incident angle-dependent reflectance, the reflectance being at lowest for zero incident angle.

Next, embodiments of the invention and advantages thereof are discussed in more detail with reference to the attached drawings.

DETAILED DESCRIPTION OF EMBODIMENTS

Figure 1:
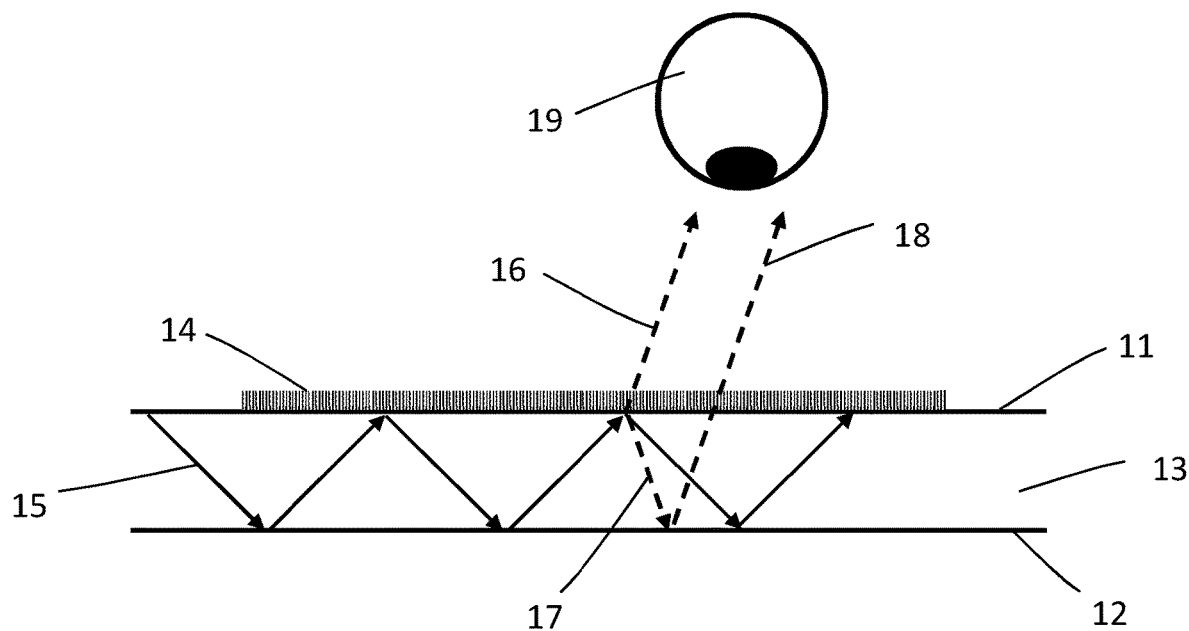
FIGS. 1 and 2 show cross-sectional side views of two possible out-coupling arrangements without an anti-interference coating.

FIG. 1 shows an out-coupling arrangement, in which the out-coupling grating 14 is located on the eye side of the waveguide. When the light field 15 propagating via total-internal reflections inside the lightguide 13 interacts with the out-coupling grating 14 at the air/lightguide interface 11, two light fields 16 and 17 are produced. The light field 16 propagates towards the eye 19 and the light field 17 towards the opposite lightguide interface 12. The light field 17 reflects partially from the interface and the light field 18 is then formed. The reflected light field 18 will interfere with the light field 16 if their coherence length is larger than their optical path length difference.

Figure 2:
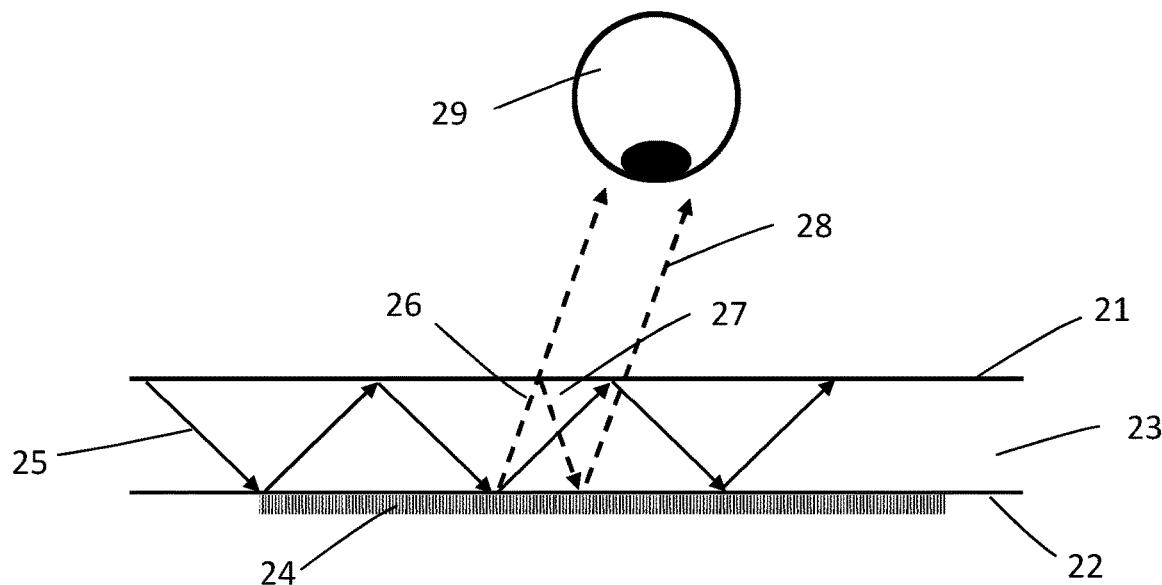

FIG. 2 shows an out-coupling arrangement, in which the out-coupling grating 24 is located on the world side (i.e. other side than the eye) of the waveguide. When the light field 25 interacts with the out-coupling grating 24 located on the lightguide/air interface 22, diffraction creates the out-coupled light field 26. This light field propagates on the interface 21 where it partially reflects towards the interface 22. The reflected field 27 propagates back towards the out-coupler where it gets reflected towards the eye. The light fields 26 and 28 interfere if their optical path length difference is smaller than the coherence length of the light fields.

Next, several embodiments of anti-interference coatings suitable for preventing interference patterns formed by the interference of out-coupled laser rays and stray rays reflecting inside the waveguide body, are discussed.

Figure 3:
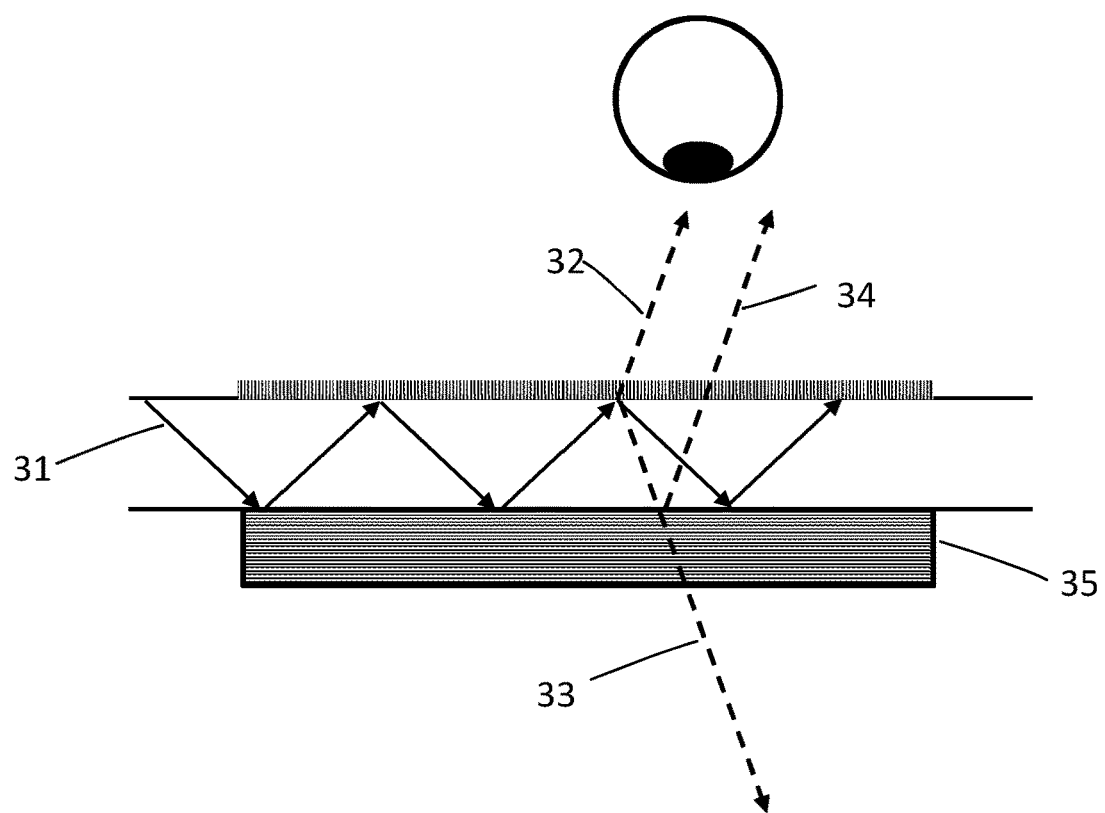
FIGS. 3-5 show cross-sectional side views of out-coupling arrangement according to embodiments of the invention.

The strength of interference patterns occurring in the configurations of FIG. 1 and FIG. 2 can be greatly reduced by producing an anti-interference coating 35 on the surface that is opposite to the out-coupling grating as illustrated in FIG. 3. FIG. 3 shows the light field 31 in the waveguide and the light field 32 directed toward the eye, and where stray ray 33 The anti-interference coating 35 reduces the intensity of reflected stray ray light field 34 so that no Newton rings are formed into the virtual image received by the user. The anti-interference coating 35 reduces the intensity of stray rays 33 that interfere with the out-coupled rays.

The coating can be a single or a multilayer structure. The layer thicknesses are typically smaller than the free space wavelength of incident light. For example, if the lightguide refractive index is 2.0, a single magnesium fluoride ($MgF_2$) layer with the thickness of 50-150 nm can be sufficient for visible wavelengths of the incident light. Multilayer structure can consist of a stack of multiple pairs of high and low refractive index material layers. In some configuration, the stack consists of multiple identical pairs. In some configurations, all the layers can have different thicknesses and/or refractive indexes. The stack can be numerically optimized by using multilayer solvers based directly on Maxwell equations. The basic idea is to find a multilayer structure that reflects as little as possible out-coupled light towards the user's eye but still remains the total internal reflection property for light fields incident on the out-coupling region from other regions of the lightguide. The high refractive index materials can be, for example, metal oxides such as $Al_2O_3$ and $TiO_2$. The low refractive index medium can be, e.g. $MgF_2$, $SiO_2$, or some aerogel material. Aerogel materials are attractive as their refractive index is close to 1. Also low refractive index materials based on fluorinated monomers can be used.

Figure 4:
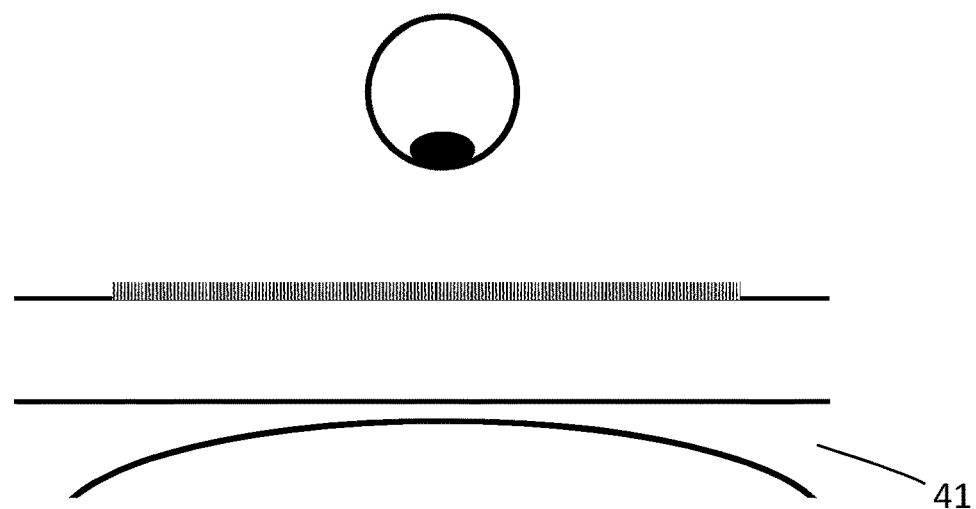
Figure 5:
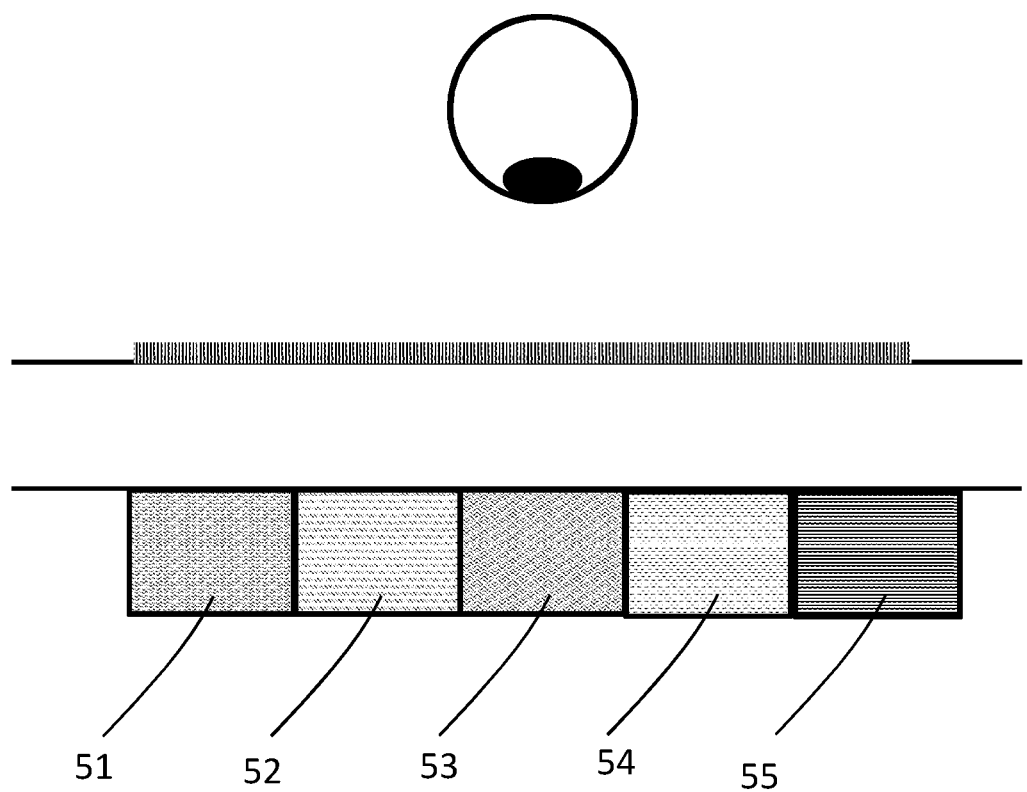

FIGS. 4 and 5 illustrate spatially varying anti-interference coatings. Light fields of different field of view (FOV) angles exit the out-coupling grating from well-defined regions. This can be utilized when the anti-interference coating is designed. The coating can have for example thickness that varies over the out-coupling regions so that the thickness in each location is optimized for angles emanating from that area into the user's eye. This makes it possible to design an anti-interference coating that works for augmented reality (AR) devices having large FOV.

FIG. 4 illustrates a single layer coating 41 with varying thickness over the out-coupling region. Varying thickness can be realized both with single and multilayer coating structures. In the case of a multilayer coating, the number of layers and/or the thickness of individual layers can be varied.

FIG. 5 shows a multilayer configuration comprising a plurality of segments 51-55 arranged laterally with respect to each other in the waveguide plane. The number of segments and their optical properties are optimized to reduce the visibility of interference patterns in the user's field of view.

The anti-interference coating may have a wide (e.g. >300 nm) low-reflectivity wavelength band or one or more narrow low-reflectivity bands (each band being e.g. <50 nm FWHM) corresponding to the wavelength or wavelengths of the laser projector.

In some embodiments, the waveguide body has an index of refraction of 1.5 or more, such as 1.7 or more, in particular 2.0 or more. The thickness of the waveguide body is typically 1.5 mm or less, such as 1.1 mm or less, for example 0.5 mm or less.

In some embodiments, the waveguide display device is a see-through display device and the anti-interference coating and the out-coupling grating have high transmittance, such as a transmittance of at least 75%, for ambient white light.

Embodiments of the invention can be utilized in various personal display devices, augmented reality (AR), virtual reality (VR) and mixed reality (MR) devices, like near-to-the-eye displays (NEDs) and other head-mounted displays (HMDs), as well as head-up displays (HUDs), in their different forms.

The invention claimed is:

1. A diffractive waveguide display device comprising:
   an image projector capable of emitting laser rays at one or more wavelengths,
   a waveguide body having a first surface and an opposite second surface and adapted to guide said laser rays from the image projector between the first surface and the second surface,
   an out-coupling diffractive optical element on said first surface for coupling said laser rays out of the waveguide body, wherein the out-coupling diffractive optical element at least partially reflects said laser rays back into the waveguide body toward the second surface as reflected stray rays, and
   an anti-interference coating being arranged on the second surface of the waveguide body and aligned with the out-coupling diffractive optical element, wherein the anti-interference coating is configured for reducing intensity of the reflected stray rays directed toward the out-coupling diffractive optical element and thereby reducing out-coupled reflected stray rays and reducing interference of said laser rays out-coupled by the out-coupling diffractive optical element and said out-coupled reflected stray rays wherein the anti-interference coating is laterally non-uniform by having:
   a laterally non-uniform thickness: or
   a laterally non-uniform multilayer structure,
   wherein the anti-interference coating is a metal oxide, $MgF_2$, aerogel, or a material based on a fluorinated monomer.

2. The device according to claim 1, wherein the anti-interference coating has different laterally non-uniform optical properties, wherein the laterally non-uniform optical properties optionally includes angular reflectivity characteristics.

3. The device according to claim 2, wherein the anti-interference coating has laterally non-uniform thickness.

4. The device according to claim 2, wherein the anti-interference coating has laterally non-uniform multilayer structure.

5. The device according to claim 2, wherein the anti-interference coating comprises:

a first zone corresponding to a first field-of-view angle and having first optical properties, and a second zone corresponding to a second field-of-view angle and having second optical properties different from the first optical properties.

6. The device according to claim 5, wherein the anti-interference coating has laterally non-uniform thickness.

7. The device according to claim 5, wherein the anti-interference coating has laterally non-uniform multilayer structure.

8. The device according to claim 2, wherein the anti-interference coating comprises a plurality of distinct regions adjacent to each other, the regions having different optical properties.

9. The device according to claim 2, wherein the thickness or layer structure of the anti-interference coating varies over the out-coupling diffractive optical element so that the thickness or layer structure in each location is optimized for angles emanating from that area to the location of the eye of the user of the device.

10. The device according to claim 2, wherein the anti-interference coating comprises a multilayer coating with alternating layers of different materials having different refractive indices, comprising alternating layers of $Al_2O_3$ or $TiO_2$ and $MgF_2$ or $SiO_2$.

11. The device according to claim 1, wherein the anti-interference coating comprises:

a first zone corresponding to a first field-of-view angle and having first optical properties, and a second zone corresponding to a second field-of-view angle and having second optical properties different from the first optical properties.

12. The device according to claim 1, wherein the anti-interference coating comprises a plurality of distinct regions adjacent to each other, the regions having different optical properties.

13. The device according to claim 1, wherein the thickness or layer structure of the anti-interference coating varies over the out-coupling diffractive optical element so that the thickness or layer structure in each location is optimized for angles emanating from that area to the location of the eye of the user of the device.

14. The device according to claim 1, wherein the anti-interference coating comprises a multilayer coating with alternating layers of different materials having different refractive indices, comprising alternating layers of $Al_2O_3$ or $TiO_2$ and $MgF_2$ or $SiO_2$.

15. The device according to claim 1, wherein the anti-interference coating comprises a single layer structure, optionally a single layer of $MgF_2$.

16. The device according to claim 1, comprising a plurality of such waveguide bodies stacked on top of each other, each body comprising an anti-interference coating with different optical properties, wherein the different optical properties optionally includes wavelength specificity.

17. The device according to claim 1, wherein the anti-interference coating has an incident angle-dependent reflectance, the reflectance being at lowest for zero incident angle.

18. The device according to claim 1, wherein the coherence length of the laser rays is more than double thickness of the waveguide body.

19. The device according to claim 1, wherein the laterally non-uniform anti-interference coating is configured to inhibit Newton rings from stray light interfering with laser rays that are out-coupled from the waveguide body.

* * * * *